United States Patent [19]

Momiyama

[11] Patent Number: 4,749,055
[45] Date of Patent: Jun. 7, 1988

[54] POWER STEERING ASSEMBLY FOR A LARGE VEHICLE

[76] Inventor: Fujio Momiyama, c/o Hino Kojo of Hino Jidosha Kogyo Kabushiki Kaisha, 3-1-1, Hinodai, Hino-shi, Tokyo, Japan

[21] Appl. No.: 936,111

[22] Filed: Nov. 28, 1986

[30] Foreign Application Priority Data

Nov. 30, 1985 [JP] Japan .................. 60-270457

[51] Int. Cl.⁴ .................. B62D 5/08; B62D 5/10
[52] U.S. Cl. .................. 180/152; 137/106; 60/426
[58] Field of Search .................. 180/152, 153; 60/425, 60/426; 137/106

[56] References Cited

U.S. PATENT DOCUMENTS

| 3,554,089 | 1/1971 | Lang | 180/153 X |
| 3,832,849 | 9/1974 | Lang | 180/153 |
| 4,368,794 | 1/1983 | Elser et al. | 180/152 X |
| 4,382,483 | 5/1983 | Spencer | 180/152 X |

FOREIGN PATENT DOCUMENTS

| 702983 | 2/1941 | Fed. Rep. of Germany | 180/152 |
| 2128491 | 12/1971 | Fed. Rep. of Germany | 180/152 |

*Primary Examiner*—John A. Pekar
*Attorney, Agent, or Firm*—Staas & Halsey

[57] ABSTRACT

A power steering assembly for a large vehicle including a primary booster, an auxiliary booster, a primary hydraulic oil pipe adapted to connect the primary booster to the hydraulic pump, an auxiliary hydraulic oil pipe branched off from the primary hydraulic oil pipe and adapted to connect the auxiliary booster to the hydraulic pump, a control valve provided to the primary hydraulic oil pipe at an upper stream side from the place where the auxiliary hydraulic oil pipe is branched off, and a load sensing valve provided to the auxiliary hydraulic oil pipe. When the load of the primary booster is small, the oil pressure of the primary booster is low, the load sensing valve is closed, and only the primary booster is driven, whereas when the load of the primary booster becomes large, the oil pressure of the primary booster is high, the load sensing valve opened, and the auxiliary booster is driven in association with the primary booster to supplement the steering power of the primary booster.

7 Claims, 5 Drawing Sheets

POWER STEERING ASSEMBLY FOR A LARGE VEHICLE

BACKGROUND OF THE INVENTION

1. Field of the Invention

This invention relates to a power steering assembly for a large vehicle of the load sensitive type.

2. Description of Related Art

In a large vehicle, i.e., a large vehicle having steering shaft of particularly large shaft weight, a power steering assembly has a large hydraulic pump and a large power cylinder so as to obtain a rest swing capability required when the vehicle is being stopped and to obtain a steering power required when the vehicle is moving at a very low speed.

In contrast, the loads on an engine for driving the hydraulic pump becomes very large, and even at the time when the vehicle is running at a high rate of speed and a hydraulic pump having a large supply capacity is not required, a large load is placed on the engine, thereby lowering the fuel consumption ratio.

SUMMARY OF THE INVENTION

It is therefore a general object of the present invention to provide a power steering assembly for a large vehicle, wherein a hydraulic pump is relatively small, the receiving pressure area of a piston in the power cylinder assembly is relatively small, the wasteful consumption of engine generation power is restricted, the fuel consumption ratio of the engine is improved, the steering power is suitably changed according to the load when the vehicle is moving, the rest swing steering power is lightened when the vehicle is being stopped, and the wear caused by the steering is minimized.

In order to achieve the above object, there is essentially provided a power steering assembly for a large vehicle including a primary booster adapted to steer a pair of wheel shafts swingably connected to both ends of an axle, an auxiliary booster for supplementing steering power of the primary booster, a primary hydraulic oil pipe adapted to connect the primary booster to the hydraulic pump, an auxiliary hydraulic oil pipe branched off from the primary hydraulic oil pipe and adapted to connect the auxiliary booster to the hydraulic pump and a control valve provided to the primary hydraulic oil pipe at an upper stream side from the place where the auxiliary hydraulic oil pipe is branched off and a load sensing valve provided on the auxiliary hydraulic oil pipe and actuated in changeover manner according to loads of the primary booster. When the load of the primary booster is small, the hydraulic pressure of the primary booster is low, the load sensing valve is closed, and only the primary booster is driven, and when the load on the primary booster becomes large, the hydraulic pressure of the primary booster is high, the load sensing valve is opened, and the auxiliary booster is driven in association with the primary booster to supplement the steering power of the primary booster.

BRIEF DESCRIPTION OF THE DRAWINGS

The several features and advantages of the present invention will become more apparent to those skilled in the art by reference to the detailed description which follows taken in conjunction with the several figures of the drawings in which:

FIG. 3 is a vertical sectional view of a load sensing valve used in the power steering assembly of FIG. 1, in which the hydraulic pressure of the primary booster of the power steering assembly is low;

FIG. 4 is likewise a vertical sectional view of the load sensing valve of FIG. 3, in which the hydraulic pressure of the primary booster of the power steering is high.

DETAILED DESCRIPTION OF THE EMBODIMENTS

Figure 1:
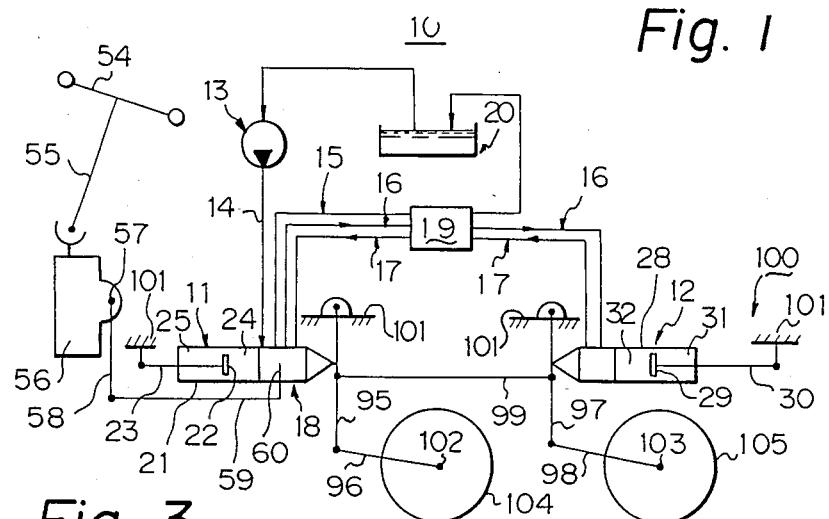
FIG. 1 is a schematic view of a power steering assembly for a large vehicle according to one embodiment of the present invention, which is incorporated in a front two-shaft type truck.

One preferred embodiment of the present invention will be described hereunder with reference to the accompanying drawings.

FIGS. 1 through 4 illustrate a power steering assembly 10 for a large vehicle embodying the present invention which is incorporated in a front two-shaft type truck 100.

The power steering assembly 10, in the front two-shaft type truck, is adapted to steer a pair of frontmost wheel shafts 102 and a pair of front and rear wheel shafts 103 which are swingably correspondingly connected to both ends of the frontmost axle (not shown) and the front and rear axle (not shown) and mutually associatedly changeable in steering angles.

The power steering assembly 10 includes a primary booster 11 adapted to steer the frontmost wheel shafts 102, an auxiliary booster 12 connected to the front and rear wheel shaft 103 side to supplement the steering power of the primary booster 11, a hydraulic pump 13, a primary hydraulic oil pipes 14, 15 for connecting the primary booster 11 to the hydraulic pump 13, an auxiliary hydraulic oil pipes 16, 17 for connecting the auxiliary booster 12 to the hydraulic pump 13, a control valve 18 provided to the primary hydraulic oil pipes 14, 15, controlled according to the steering input, that is, valve-operated by a steering wheel 54, to switch over the hydraulic fluid flow supplied from the hydraulic pump 13 to the primary and auxiliary boosters 11, 12 and to change the flow rate of the hydraulic fluid, a load sensing valve 19 provided to the auxiliary hydraulic oil pipe 16, 17 and actuated in switchover manner according to the load to the primary booster 11, and an oil reservoir 20. When the truck 100 is stopped or run at a low speed rate, or when the load becomes more than a predetermined value, the load sensing valve 19 is opened, the auxiliary booster 12 is caused to be associated with the primary booster 11, the steering power of the primary booster 11 is supplemented by the auxiliary booster 12, and the steering power is thereby increased lightened. In contrast when the truck runs under different conditions from those mentioned above, the load sensing valve 19 is closed, the auxiliary booster 12 is disconnected from the primary booster 11, the hydraulic fluid, which is supplied to the auxiliary booster 12, is caused to escape into the oil reservoir 20, the auxiliary booster 12 is disassociated from the primary booster 11, only the primary booster 11 is driven, and the steering power decreases.

The primary booster 11 is a hydraulic cylinder which comprises a cylinder housing 21, a piston 22 reciprocally slidably fitted to the interior of the cylinder housing 21 and defining the interior of the cylinder housing 21 into cylinder chambers 24, 25, and a piston rod 23 fixed at one end to the piston 22 and pivotally connected at the other end to a chasse 101 so that the other end side thereof can be moved in and out from the cylinder housing 21. The body of the cylinder housing 21 contains therein the control valve 18.

The primary booster 11 pivotally connects the cylinder housing 21 to an idle arm 95 for the frontmost wheel shafts 102 and is connected to an idle arm 97 for the front and rear wheel shafts 103 through a relay rod 99.

Of course, since the front idle arm 95 rotatably connects its upper end to the chasse 101 and rotatably connects its lower end to a drag link 96, and the front drag link 96 is rotatably connected to a knuckle arm (not shown) of a knuckle (not shown) which rotatably connects the frontmost wheel shafts 102 to the frontmost axle, the front idle arm 95 is caused by the primary booster 11 to pivot about the pivotally connected portion at its upper end in the forward and backward direction of the truck 100 with respect to the chasse 101 to change the steering angles of the frontmost wheel shafts 102, i.e., the frontmost wheels 104 rotatably supported on the frontmost wheel shafts 102.

The knuckle, which includes the frontmost wheel shafts 102 and rotatably connects it to the frontmost axle, is of course of the same construction as the conventional knuckle for the front two-shaft type truck and is formed in a generally L-shape including a knuckle arm and a tie rod arm (not shown) and is rotatably connected to both sides of the frontmost axle through a king pin (not shown).

Between the tie rod arms of the pair of knuckles rotatably connected to both ends of the frontmost axle, a tie rod (not shown) is rotatably connected.

On the other hand, since the rear idle arm 97 rotatably connects its upper end to the chasse 101 and rotatably connects its lower end to a drag link 98, and the rear drag link 98, same as in the case of the front idle arm 95, is rotatably connected to a knuckle arm (not shown) of a knuckle (not shown) which rotatably connects the front and rear wheel shafts 103 to the front and rear axles, the rear idle arm 97, through an idle arm 117 and a relay rod 99, is caused by the primary booster 11 to pivot about the pivotally connected portion at its upper end in the forward and backward direction of the truck 100 with respect to the chassis 101 to change the steering angles of the front and rear wheel shafts 103, i.e., the front and rear wheels 104 rotatably supported on the front and rear wheel shafts 103.

The knuckle, which is of the same construction as that of the afore-mentioned frontmost wheel shafts 102, is formed in a generally L-shape including a knuckle arm and a tie rod arm (not shown) and is rotatably connected to both sides of the front and rear axles through a king pin (not shown).

Between the tie rod arms of the pair of knuckles rotatably connected to both ends of the front and rear axles, a tie rod (not shown) is rotatably connected.

Accordingly, when the primary booster 11 is driven and the front and rear idle arms 95, 97 are swung in the forward and backward direction with repsect to the chasse 101 in association with the relay rod 99 through the front and rear drag links 96, 98, the front and rear knuckles are caused to pivot around the king pins of the frontmost axle and the front and rear axle corresponding thereto, and the frontmost wheel shafts 102 and the front and rear wheels 105, i.e., the frontmost wheels 104 and the front and rear wheels 105, are steered in synchronism.

The auxiliary booster 12 is connected to the front and rear wheel shaft 103 side of the front and rear axle in order to supplement the steering power of the primary booster 11, driven by hydraulic fluid bled from the hydraulic pump 13 via the control valve 18 according to the action of the load sensing valve 19, and associated with the primary booster 11.

The auxiliary booster 12 is a hydraulic cylinder, same as the primary booster 11, which comprises a cylinder housing 28, a piston 29 reciprocally slidably fitted to the interior of the cylinder housing 28 and defining the interior of the cylinder housing 28 into cylinder chambers 31, 32, and a piston rod 30 fixed at one end to the piston 29 and the other end side thereof can be moved in and out from the cylinder housing 28, and pivotally connects the cylinder housing 28 to an idle arm 95 and the other end to the chassis 101 respectively.

Accordingly, when the auxiliary booster 12 is driven and the rear idle arm 97 is swung in the forward and backward direction with respect to the chasse 101 through the rear drag link 98, the knuckle is caused to pivot around the king pins of the front and rear axles, and the front and rear wheel shafts 103, i.e., the front and rear wheels 105, are steered. At this time, the steering power of the auxiliary booster 12 is of course transmitted to the front idle arm 95 through the relay rod 99 to swing the idle arm 95 in the forward and backward direction with respect to the chasse 101 through the front drag link 96, to cause the front knuckle to be pivoted about the king pin of the frontmost axle and to steer the frontmost wheel shafts 102, i.e., the frontmost wheels 104.

In this way, the auxiliary booster 12 synchronously supplements the steering power of the primary booster 11.

The hydraulic pump 13 is driven by an engine (not shown) installed on the truck 100 and generates hydraulic pressure for driving the primary and auxiliary boosters 11, 12. The hydraulic pump 13 is arranged as such that the supplying capacity thereof is set based on the output of only the primary booster 11 as the supplying capacity of the conventional oil pump was set based on the output of the booster. Since the hydraulic pump 13 is of course of the substantially same construction as that of the hydraulic pump to be used for the conventional power steering assembly, description of the construction thereof will be omitted.

Figure 2:
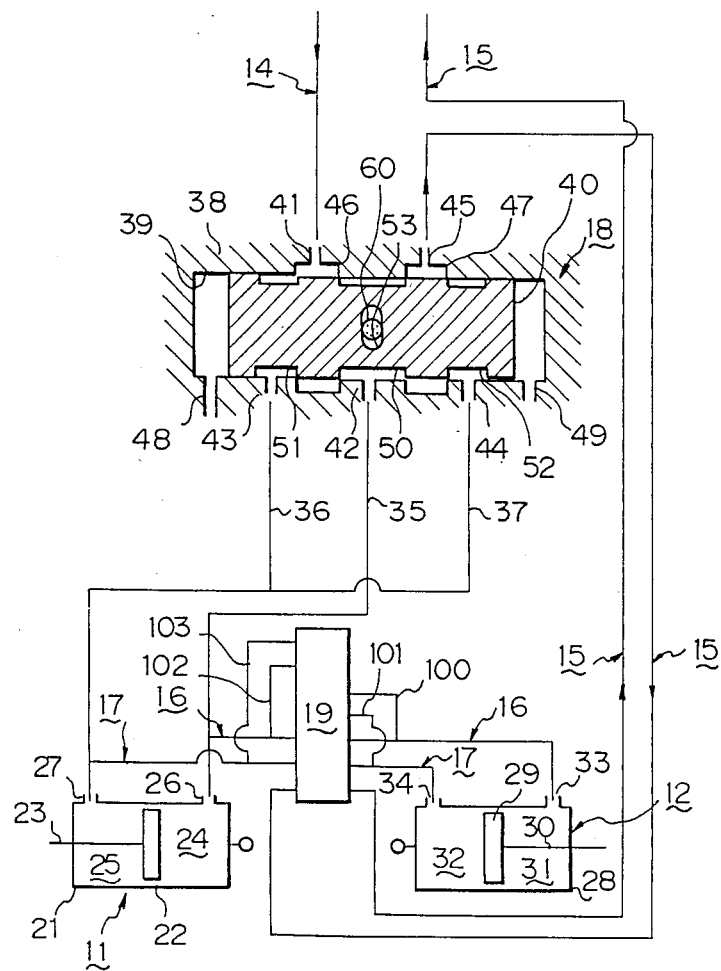
FIG. 2 is a schematic view of a hydraulic circuit of the power steering assembly of FIG. 1 in a control valve in section.

Referring now to FIG. 2, the primary hydraulic oil pipes 14, 15 are adapted to connect the primary booster 11, hydraulic pump 13, control valve 18 and oil reservoir 20 to the primary hydraulic fluid circuit. The primary hydraulic oil pipe 14, which is a supply side hydraulic oil pipe, is adapted to connect the hydraulic pump 13 to the control valve 18 connected to the primary booster 11 at communication passages 35, 36 and 37 which form a part of the primary hydraulic oil pipe 14 and also to connect the oil reservoir 20 the the hydraulic pump 13 so that hydraulic fluid which is bled from the hydraulic pump 13 and controlled its flow rate with the control valve 14, can be supplied to the primary booster 11.

On the other hand, the primary hydraulic pipe 15, which is a return side hydraulic oil pipe, is adapted to connect the oil reservoir 20 to the control valve 14 and to return hydraulic fluid from the primary booster 11 to the oil reservoir 20. In addition, there is provided the load sensing valve 19 in the midway thereof so that the hydraulic fluid of the auxiliary booster 12 can be returned to the oil reservoir 20.

The auxiliary hydraulic oil pipes 16, 17 are left and right turn hydraulic oil pipes branched off from the primary hydraulic oil pipes 14, 15 and adapted to connect the auxiliary booster 12 to the primary booster 11 at the auxiliary hydraulic fluid circuit and to synchronize the auxiliary booster 12 with respect to the primary booster 11.

The auxiliary hydraulic oil pipes 16, 17 are branched off from the communication passages 35, 36 which are the primary hydraulic oil pipes 14, 15, and adapted to connect the auxiliary booster 12 to the hydraulic pump 13, to supply hydraulic fluid, which is bled from the hydraulic pump 13 and its direction and flow rate controlled with the control valve 18, to the auxiliary booster 12, in order to drive the auxiliary booster 12 in synchronism with the primary booster 11 and to return the hydraulic fluid from the auxiliary booster 12 to the oil reservoir 20.

The control valve 18 is built in the body of the cylinder housing 21 of the primary booster 11 and valve-operated by a steering wheel 54. Of course, the control valve 18 is placed at the primary hydraulic oil pipes 14, 15 and communication passages 35, 36 and 37 adapted to connect the hydraulic pump 13 and the oil reservoir 20 the the primary booster 11 at the primary hydraulic fluid circuit, and adapted to control the direction of the hydraulic fluid bled from the hydraulic pump 13, to supply it to the primary booster 11, to control the direction of the hydraulic fluid worked at the primary booster 11, to return the hydraulic fluid to the oil reservoir 20 which is at the intake side of the hydraulic pump 13, and to supply the hydraulic fluid bled from the hydraulic pump 13 to the auxiliary booster 12.

The control valve 18, as understood from FIG. 2, comprises a valve body 38 including a valve bore 39 therein, and a spool 40 reciprocally slidably mounted on the valve body 39.

The valve body 38 is built in the body of the cylinder housing 21 of the primary booster 11 and includes a pump port 41, cylinder ports 42, 43, 44 and a tank port 45 opened up in the valve bore 39 at predetermined position.

The pump port 41 and the tank port 45 respectively form openings at the inner peripheral surface of the valve bore 39 in ring grooves 46, 47.

The valve body 38 is provided with the vent ports 48, 49, which are communicated with the oil reservoir 20 side and opened up at both ends of the valve bore 39 respectively.

The spool 40, when held in a neutral position, is formed at its outer peripheral surface with spool grooves 50, 51, 52 positioned at the cylinder ports 42, 43, 44 in relation to the ring grooves 46, 47 of the pump port 41 and the tank port 45. The spool grooves 50, 51, 52 connect in switchover manner the pump port 41 to the cylinder ports 42, 43, 44 and the cylinder ports 42, 43, 44 to the tank port 45 as the spool 40 is reciprocally slided within the valve bore 39.

The spool 40 is formed with a pin bore 53 at the central portion in the axial direction and allows the front end of an input shaft 60 penetrating through the valve bore 38 and extending to fit in the pin bore 53.

In the control valve 18 having the above-described construction, in order to supply hydraulic fluid bled from the hydraulic pump 13 to the cylinder chambers 24, 25 of the primary booster 11 and the cylinder chambers 31, 32 of the auxiliary booster 12, the pump port 41 is connected to the discharge port of the hydraulic pump 13 by means of the primary hydraulic oil pipe 14, and the cylinder ports 42, 43, 44 respectively connected to the oil ports 26, 27 of the primary booster 11 by means of the communication passages 35, 36, 37 and to the oil ports 33, 34 of the auxiliary booster 12 by means of the auxiliary hydraulic oil pipes 16, 17 branched off from the communication passages 35, 36, and, in addition, the tank port 45 is connected to the oil reservoir 29 by means of the primary hydraulic oil pipe 15.

In order to be valve-operated by the steering wheel 54, the control valve 18 connects a steering shaft 55 attached with the steering wheel 54 to an input shaft 60 through a steering gear box 56 connected to the steering shaft 55, a pitman arm 58 fixed to a sector shaft 57 of the steering gear box 56, and a compensating rod 59 adapted to connect the pitman arm 58 to the input shaft 60, so that motion of the steering wheel 54 can be transmitted to the input shaft 60, and the spool 40 is reciprocally slidable within the valve bore 39 due to the steering input of the steering wheel 54.

The load sensing valve 19 is a part of the primary hydraulic oil pipes 14, 15, placed at the auxiliary hydraulic oil pipes 16, 17 which are branched off from the communication passages 35, 36 for connecting the control valve 18 to the primary booster 11 and the primary hydraulic oil pipe 15 between the control valve 18 and the oil reservoir 20, and has such construction as shown in FIGS. 3 and 4, that is, the valve 19 is opened and closed according to the load on the truck 100, i.e., the quantity of the hydraulic fluid generated in the primary booster 11.

The load sensing valve 19, as understood from FIGS. 3 and 4, includes a valve body 61 formed therein with a valve bore 62, a spool 63 reciprocally slidably arranged in the valve bore 62, and a set pressure spring 64.

The valve body 61 is formed therein with the valve bore 62 and the valve bore 62 is formed at one end portion thereof with left turn and right turn control pressure chambers 65, 66 formed cooperated by the spool 63, and at the other end portion thereof with an oil pool chamber 67 formed cooperated by the spool 63.

The valve body 61 includes a pair of control valve ports 68, 69, a pair of cylinder ports 70, 71 and a pair of tank lead ports 72, 73 opened up in the valve bore 62 at predetermined positions. The valve body 61 further includes pressure lead ports 74, 75 opened up in the left turn and the right turn chambers 65, 66. The valve body 61 further includes a pair of tank ports 76, 77 opened up in the oil pool chamber 67.

Of course, the control valve ports 68, 69 connect the auxiliary hydraulic oil pipes 16, 17 and are correspondingly connected to the cylinder ports 42, 43 and 44 of the control valve 18 by the auxiliary hydraulic oil pipes 16, 17. The cylinder ports 42, 43 and 44 connect the auxiliary hydraulic oil pipes 16, 17 and are correspondingly connected to the oil ports 33, 34 of the auxiliary booster 12 by the auxiliary hydraulic oil pipes 16, 17. When the spool 63 is driven by the hydraulic fluid of the primary booster 11, the pressure oil controlled by the control valve 18 can be selectively supplied to the cylinder chambers 31, 32 of the auxiliary booster 12.

The tank lead ports 72, 73, at the auxiliary booster 12 side, connect return pipes 78, 79 branched off from the auxiliary hydraulic oil pipes 16, 17 and are correspondingly connected to the oil ports 33, 34 of the auxiliary booster 12 by the return pipes 78, 79. When the spool 63 is driven by the hydraulic fluid of the primary booster 11, the pressure oil within the cylinder chambers 31, 32 of the auxiliary booster 12 can be selectively returned to the oil reservoir 20.

The pressure lead ports 74, 75, at the primary booster 11 and the control valve 18 sides, connect control pressure lead pipes 80, 81 branched off from the auxiliary hydraulic oil pipes 16, 17, and are correspondingly connected to the oil ports 26, 27 of the primary booster 11 and the cylinder ports 42, 43 and 44 of the control valve 18, so that the pressure oil of the primary booster 11 can be introduced to the corresponding left turn and right turn control pressure chambers 65, 66.

The tank ports 76, 77 are connected to the primary hydraulic oil pipe 15, so that the pressure oil flowing out from the primary booster 11 and the auxiliary booster 12 can be returned to the oil reservoir 20 through the primary hydraulic oil pipe 15 via the oil pool chamber 67.

These cylinder ports 70, 71, and tank lead ports 72, 73 respectively are provided with ring grooves 82, 83, 84, 85 which are opened up at the inner peripheral surface of the valve bore 62.

The spool 63 is formed at one end portion with left turn and right turn pressure faces 86, 87 corresponding to the left turn and the right turn control pressure chambers 65, 66. The spool 63 is also provided with a communication hole 88 bored by a drill opening up at an end face of the other end portion of the spool 63 from the control pressure chambers 65, 66.

The spool 63 is further provided with communication ports 89, 90 adapted to allow communication to and from the communication hole 88 and the tank lead ports 72, 73.

Furthermore, the spool 63 is formed at predetermined spaces on the outer peripheral surface with spool grooves 91, 92, 93, 94 in relation to the ring grooves 82, 83, 84, 85 which are in the form of "openings" of the cylinder ports 70, 71 and the tank ports 76, 77 formed at the inner peripheral surface of the valve bore 62. In particular, the spool grooves 93, 94 are communicated with the communication hole 88.

The set pressure spring 64 comprises a coil spring, which is placed in the oil pool chamber 67 to push the spool 63 toward one end of the valve bore 62.

Next, the operation of the power steering assembly 10 will be described with respect to the running state of the front two-shaft type truck 100. It is presumed that the truck is diesel engine driven, and the hydraulic pump 13 is actuated. Pressure oil bled from the hydraulic pump 13 flows through the primary hydraulic oil pipe 14 and is transmitted to the pump port 41 of the control valve 18.

The pressure oil transmitted to the pump port 41, when the spool 63 is held in the neutral position as shown in FIG. 2, flows from the pump port 41 to the tank port 45 and is returned to the oil reservoir 20 via the primary hydraulic oil pipe 15 and via the oil pool chamber 67 of the load sensing valve 19 which is connected to an intermediate portion of the primary hydraulic oil pipe 15. When the steering wheel 54 is steered, the input shaft 60 is swung in one direction through the steering shaft 55, steering gear box 56, pitman arm 58 and compensating rod 59 and the spool 40 is slid in the swung direction of the input shaft 60, the pressure oil is transmitted to either one of the cylinder chambers 24, 25 of the primary booster 11 via one of the communication passages 35, 36 and 37 according to the motion of the spool 40. At the same time, the pressure oil flows into either one of the auxiliary hydraulic oil pipes 16, 17 corresponding to the communication passages 35, 36 and is placed in the state that it is ready to be supplied to either one of the cylinder chambers 31, 32 of the auxiliary booster 12 corresponding to the cylinder chambers 24, 25 of the primary booster 11.

Next, the operation will be described when the truck 100 is with a load and stopped and the steering wheel 54 is rest swung, move-aside and reversely swung.

Now, if the steering wheel 54 is operated in order to perform a rest swing, move-aside and reverse swing, the operation power of the steering wheel 54 is transmitted to the input shaft 60 via the steering shaft 55, steering gear box 56, pitman arm 58 and compensating rod 59, and the spool 40, in the control valve 18, is slid toward either direction within the valve bore 39 by the input shaft 60, the control port 41, in the control valve 18, will be in communication to any one of the cylinder ports 42, 43 and 44. As a result, the pressure oil transmitted from the hydraulic pump 13 will flow into one of the communication passages 35, 36 and 37 and be supplied to either one of the cylinder chambers 24, 25 of the cylinder housing 21 of the corresponding primary booster 11. At this time, since the oil pressure, in the primary booster 11, is gradually increased exceeding a predetermined value in order to generate a steering power for the frontmost wheels 104 and the front and rear wheels 105 corresponding to the weight of load on the truck 100, the high pressure oil flowing into either one of the auxiliary hydraulic oil pipes 16, 17, in the load sensing valve 19, will be supplied to either one of the corresponding left turn and right turn control pressure chambers 65, 66 via either one of the control pressure lead pipes 80, 81 and push down the spool 63 within the valve bore 62 resisting the force of the set pressure spring 64 as shown in FIG. 4, and the control valve ports 68, 69 will be in communication with to the cylinder ports 70, 71. At this time, since the tank lead ports 72, 73 will be closed by the spool 63, the pressure oil is likewise supplied to either one of the cylinder chambers 31, 32 of the cylinder housing 28 corresponding to the primary booster 11 in the auxiliary booster 12.

Of course, the pressure oil in the cylinder chambers 24, 25 of the primary and the auxiliary boosters 11, 12 and in the other one of the cylinder chambers 31, 32, is returned to the oil reservoir 20 via the oil pool chamber 67 of the load sensing valve 19.

Accordingly, the primary and auxiliary boosters 11, 12 are mutually synchronously driven by the pressure oil from the hydraulic pump 13, the frontmost wheel 104 and the front and rear wheels 105 are synchronously steered, and the rest swing, move-aside and reverse swing are smoothly performed with an appropriate operation power, i.e., very small operation power.

When the truck 100 runs at a very low speed, the primary and auxiliary boosters 11, 12 are synchronously driven by the pressure oil transmitted from the hydraulic pump 13 in the same manner as described and the steering can be performed with a very small operation power.

When the truck is stopped or runs at a very low speed as mentioned, a radical steering operation is not required in general and the primary and auxiliary boosters 11, 12 can be sufficiently driven with a comparatively small quantity of the pressure oil bled from the hydraulic pump 13. Accordingly, the steering can be performed with the primary and auxiliary boosters 11, 12 without making the hydraulic pump 13 large. Thus, load on the engine for driving the hydraulic pump 13 can be minimized and fuel consumption ratio of the engine can be improved.

Next, there will be described the truck 100 when it runs with increased speed from the very low speed to the normal, operating speed.

In the normal running state, when the steering wheel is operated, the operation power of the steering wheel 54 is transmitted to the input shaft 60 in the same manner as described above. When the spool 40 is slid in either direction within the valve bore 39 in the control valve 18, the pump port 41 communicates with either one of the cylinder port 42 or the cylinder ports 43, 44 in the control valve 18. As a result, the pressure oil bled from the hydraulic pump 13 flows into either the communication passage 35 or the communication passages 36, 37 and is supplied to one of the cylinder chambers 24, 25 of the cylinder housing 21 of the corresponding primary booster 11.

In this case, since the frontmost wheels 104 and the front and rear wheels 105 are placed in a state that they can be lightly steered, the oil pressure for generating the steering power for the frontmost wheels 104 and the front and rear wheels 105 is lower than a predetermined value in the primary booster 11. Accordingly, the pressure oil flowing into either one of the auxiliary hydraulic oil pipes 16, 17 is supplied to either one of the corresponding left turn and right turn control pressure chambers 65, 66 via either one of the control pressure lead pipes 80, 81. However, the spool 63 is not pushed down within the valve bore 62 in the load sensing valve 19. Instead, the spool 63 is held in the state where it is pushed up by the set pressure spring 64 within the valve bore 62 as shown in FIG. 3, and the communication between the control valve ports 68, 69 and the cylinder ports 70, 71 is broken by the spool 63. On the other hand, the tank lead ports 72, 73 communicate with the oil pool chamber 67 through the communication hole 88 of the spool 63. As a result, the pressure oil is not supplied to the auxiliary booster 12. On the other hand, the auxiliary booster 12 is in communication with the oil reservoir 20.

In this way, the pressure oil bled from the hydraulic pump 13 is transmitted only to the primary booster 11 and the auxiliary booster 12 not used.

Therefore, the steering, when in the normal running, is performed only by primary booster 11, and the auxiliary booster 12 freely follows the steering of the primary booster 11 without substantially resisting the steering by the primary booster 11.

In the aforementioned power steering assembly 10, the flow control valve and the relief valve were omitted from the description in order to make description simple.

Also, in the aforementioned power steering assembly 10, the load sensing valve 19 is used so as to be able to connect the auxiliary booster 12 to the primary booster 11, thereby providing a load sensitive characteristic. In addition, an operation feeling and a driving stableness are held constant regardless whether the truck 100 is loaded or unloaded. That is, the present invention maintains a constant steering wheel feeling (and power directed toward the power steering assembly) relative to the conditions at hand. Alternatively, if the control valve 18 used in the power steering assembly 10 is constituted as a speed sensitive type, in addition to the load sensitive characteristic, the most appropriate steering power corresponding to the vehicle speed can be obtained. Thus, the so-called excellent speed sensitive characteristic can be provided, and the operation feeling and driving stableness can be improved.

Figure 5:
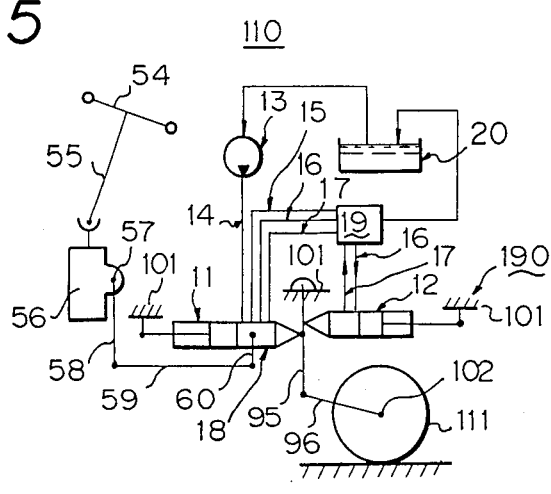
FIGS. 5 through 12 are schematic views of power steering assemblies for a large vehicle according to other embodiments of the present invention.

FIGS. 5 through 12 inclusive illustrate other embodiments 110, 120, 130, 140, 150, 160, 170, 180 of a power steering assembly for a large vehicle of the presnet invention. The power steering assembly 110 shown in FIG. 5 is applied to a front one-shaft large truck 190.

In this power steering assembly 110, the auxiliary booster 12 is pivotally connected to an idle arm 95 for a front wheel 111.

Figure 6:
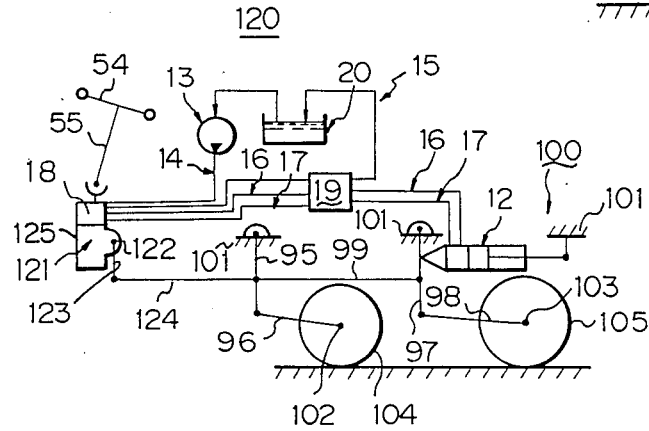

The power steering assembly 120 shown in FIG. 6 is applied to the front two-shaft type truck 100.

In the power steering assembly 120, the primary booster 121 is formed in a cylinder housing 125 integral with the steering gearbox and connects a pitman arm 123 fixed to a center shaft 122 of the primary booster 121 to the idle arm 95 through a compensating rod 124. A similar linkage assembly is provided for the auxiliary booster 12. This separate type linkage assembly is similar to the embodiment illustrated in FIG. 1. Also contained in the cylinder housing 125 for the integrated primary booster/steering gear box 121 is the control valve 18.

Figure 7:
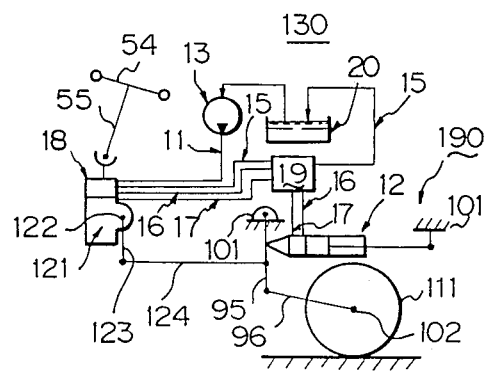

The power steering assembly 130 shown in FIG. 7 is applied to the front one-shaft large truck 190.

This power steering assembly 130 is a modification of the power steering assembly 120 shown in FIG. 6 in order to be applied to the large truck 190, in which the auxiliary booster 12 is pivotally connected to the idle arm 95.

Figure 8:
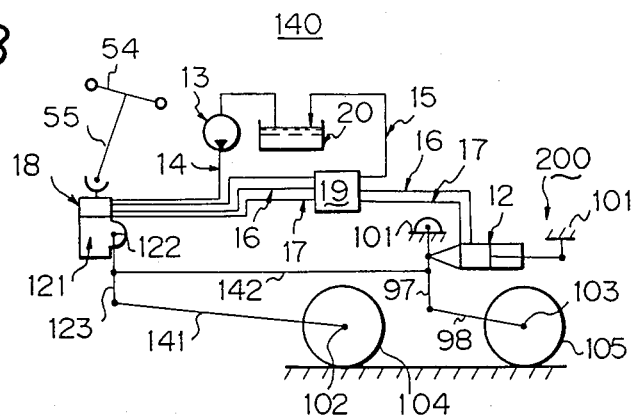

The power steering 140 shown in FIG. 8 is applied to a front two-shaft type truck 200.

This power steering assembly 140 is a modification of the power steering assembly 120 shown in FIG. 6 so as to correspond to the truck 200, in which a drag link 141 for the frontmost wheel 104 and a relay rod 142 for the front and rear wheel 105 are connected to the pitman arm 123 fixed to the center shaft 122 of the primary booster 121.

Figure 9:
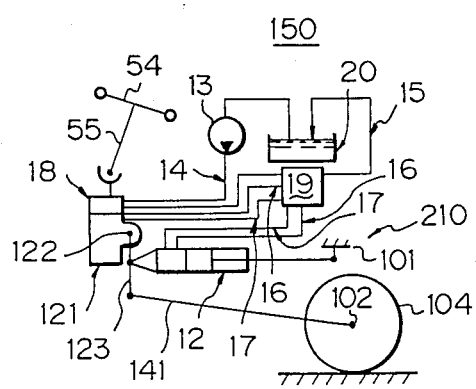

The power steering assembly 150 shown in FIG. 9 is applied to a front one-shaft large truck 210.

This power steering assembly 150 is a modification of the power steering 140 shown in FIG. 8 in order to be applied to the large truck 210, in which the auxiliary booster 12 is connected to the pitman arm 123 fixed to the center shaft 122 of the primary booster 121.

Figure 10:
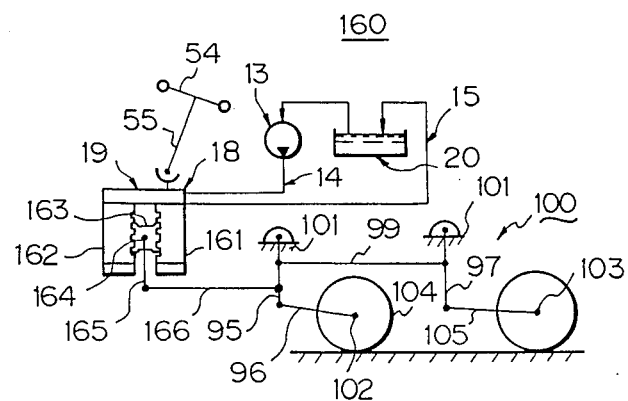

The power steering assembly 160 shown in FIG. 10 is applied to the front two-shaft type truck 100.

This power steering assembly 160 is of a dual cylinder type, i.e., the type in which a power cylinder assembly is divided into two parts to form a primary booster 161 and an auxiliary booster 162, in which the control valve 18 is built in the primary booster 161, the load sensing valve 19 is interposed between the primary booster 161 and the auxiliary booster 162, and the auxiliary hydraulic oil pipes 16, 17, which were used in the aforementioned power steering assembly 10, are built in the cylinder bodies of the primary and auxiliary boosters 161, 162.

Furthermore, this power steering assembly 160 is a combined type linkage assembly for both the primary and auxiliary boosters 161, 162. The assembly 160 connects the pitman arm 165 fixed to the center shaft 164 of the sector gear 163 which were commonly used by the primary booster 161 and the auxiliary booster 162 to the idle arm 95 through a drag rod 166.

Figure 11:
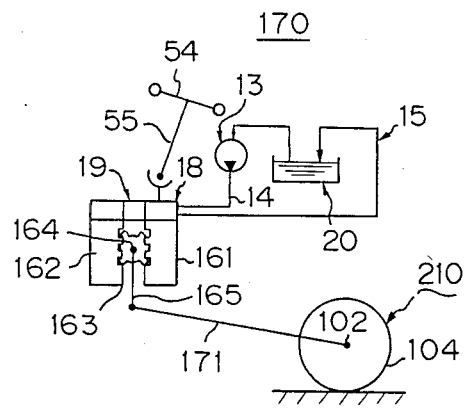

The power steering assembly 170 shown in FIG. 11 is applied to a front one-shaft large truck 210.

This power steering assembly 170 is a modification of the power steering assembly 160 shown in FIG. 10 so as to correspond to the truck 210, in which a drag link 171 for the front wheel 104 is connected to the pitman arm 165.

Figure 12:
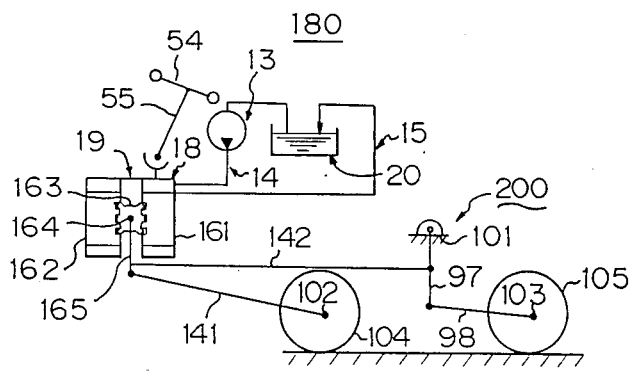

The power steering assembly 180 shown in FIG. 12 is applied to the front two-shaft type truck 200.

This power steering assembly 180 is a modification of the power steering assembly 160 shown in FIG. 10 so as to correspond to the truck 200, in which the drag link 141 for the frontmost wheel 104 and the relay rod 142 for the front and rear wheels 105 are connected to the pitman arm 165 fixed to the center shaft 164 of the sector gear 163 which is commonly used by the primary booster 161 and the auxiliary booster 162.

Identical component parts of the above-described power steering assemblies 110, 120, 130, 140, 150, 160, 170, 180 are denoted by identical numerals with respect to each other, and the constitutions corresponding to that of the afore-described power steering assembly 10 are given the identical reference numeral 10, and descriptions are omitted.

From the foregoing description on the preferred embodiment of the present invention referring to the accompanying drawings, various modification and changes in construction will easily occur to those having ordinary knowledge in the art and furthermore, the present invention may be embodied in substantially similar modes which fulfill substantially the same purpose and attain substantially the same effects as those described in connection with the preferred embodiment.

What is claimed is:

1. A power steering assembly for a large vehicle comprising:
    a primary booster adapted to steer a pair of wheel shafts swingably connected to both ends of an axle;
    an auxiliary booster for supplementing steering power of said primary booster;
    a primary hydraulic pipe adapted to connect said primary booster to a hydraulic pump;
    a control valve provided to said primary hydraulic pipe between said primary booster and said hydraulic pump;
    an auxiliary hydraulic pipe branched off from said primary hydraulic pipe betwen said primary booster and said control valve and adapted to connect said auxiliary booster to said hydraulic pump through said control valve; and
    a load sensing valve provided to said auxiliary hydraulic pipe and actuated in changeover manner in response to loads of said primary booster for activating said auxiliary booster.

2. A power steering assembly as in claim 1, wherein said load sensing valve comprises a valve body with a valve bore formed inside thereof; a spool reciprocally slidably disposed in said valve bore in such a manner as to form right turn and left turn control pressure chambers at a closed end of said valve bore and an oil pool at an open end of said valve bore; a set pressure springs disposed in said oil pool; a pair of control valve ports for connecting said load sensing valve via said auxiliary hydraulic pipe to said control valve; a pair of cylinder ports for connecting said load sensing valve via said auxiliary hydraulic pipe to said auxiliary booster; a pair of tank lead ports and a pair of tank ports formed on said valve body and opened up at predetermined positions of said valve bore so as to be connected in changeover manner by said spool; and a pair of pressure lead ports formed on said valve body and opened up at said left turn and right turn control pressure chambers, respectively.

3. A power steering assembly as in claim 1, further comprising:
    a steering gear box; and
    a cylinder housing for integrally housing said primary booster, said control valve and said steering gear box.

4. A power steering assembly as in claim 1, further comprising a steering gear box integrally connected with said control valve.

5. A power steering assembly as in claim 1, further comprising a steering gear box forming with said primary booster and said control valve a combined type linkage power steering gear assembly.

6. A power steering assembly as in claim 1, further comprising a steering gear box forming with said primary booster and said control valve a separate type linkage power steering gear assembly.

7. A power steering assembly as in claim 1, wherein said primary booster and said auxiliary booster are formed in a common cylinder housing.

* * * * *

UNITED STATES PATENT AND TRADEMARK OFFICE
CERTIFICATE OF CORRECTION

PATENT NO. : 4,749,055

DATED : June 7, 1988

INVENTOR(S) : Fujio Momiyama

It is certified that error appears in the above-identified patent and that said Letters Patent is hereby corrected as shown below:

Col. 3, line 65, "repsect" should be --respect--.

Col. 5, line 19, after "and" (1st occurrence) insert --has--;

line 43, "39" should be --38--;

line 68, "38" should be --39--.

Col. 6, line 14, "29" should be --20--.

Col. 8, line 43, delete "to".

Col. 10, line 12, "presnet" should be --present--.

Signed and Sealed this

Eleventh Day of October, 1988

Attest:

DONALD J. QUIGG

Attesting Officer

Commissioner of Patents and Trademarks